United States Patent
Gnecchi et al.

(10) Patent No.: US 10,585,174 B2
(45) Date of Patent: Mar. 10, 2020

(54) LIDAR READOUT CIRCUIT

(71) Applicant: SensL Technologies Ltd., County Cork (IE)

(72) Inventors: Salvatore Gnecchi, Cork (IE); John Carlton Jackson, Cobh (IE)

(73) Assignee: SENSL TECHNOLOGIES LTD., County Cork (IE)

( * ) Notice: Subject to any disclaimer, the term of this patent is extended or adjusted under 35 U.S.C. 154(b) by 313 days.

(21) Appl. No.: 15/456,193

(22) Filed: Mar. 10, 2017

(65) Prior Publication Data

US 2018/0259625 A1 Sep. 13, 2018

(51) Int. Cl.
| | |
|---|---|
| *G01S 7/48* | (2006.01) |
| *G01S 7/481* | (2006.01) |
| *G01T 1/24* | (2006.01) |
| *G01S 7/487* | (2006.01) |
| *G01S 7/4861* | (2020.01) |
| *G01S 7/4863* | (2020.01) |

(52) U.S. Cl.
CPC .......... *G01S 7/4816* (2013.01); *G01S 7/4861* (2013.01); *G01S 7/4863* (2013.01); *G01S 7/4873* (2013.01); *G01T 1/248* (2013.01)

(58) Field of Classification Search
CPC ....... G01S 17/10; G01S 7/4863; G01S 7/4873
See application file for complete search history.

(56) References Cited

U.S. PATENT DOCUMENTS

| | | | | |
|---|---|---|---|---|
| 5,404,021 | A * | 4/1995 | Mangano | B23B 49/00 250/559.26 |
| 2003/0177438 | A1* | 9/2003 | Waschura | H04L 1/24 714/819 |
| 2010/0264301 | A1* | 10/2010 | Borosak | G01S 7/4804 250/252.1 |
| 2013/0250272 | A1* | 9/2013 | Ludwig | G01S 17/10 356/4.01 |
| 2013/0313414 | A1 | 11/2013 | Pavlov et al. | |
| 2015/0041627 | A1* | 2/2015 | Webster | H01L 27/14634 250/208.2 |
| 2016/0181293 | A1 | 6/2016 | McGarvey et al. | |
| 2016/0231168 | A1 | 8/2016 | Guo et al. | |
| 2017/0099422 | A1* | 4/2017 | Goma | H01L 27/146 |
| 2018/0218488 | A1* | 8/2018 | strom | G06T 7/0002 |

OTHER PUBLICATIONS

International Search Report and Written Opinion for International Application No. PCT/EP2018/055737, dated Jun. 4, 2018, 9 pages.

* cited by examiner

*Primary Examiner* — Luke D Ratcliffe
(74) *Attorney, Agent, or Firm* — Polansky & Associates, P.L.L.C.

(57) ABSTRACT

A LiDAR readout circuit is described. The readout circuit comprises an SiPM sensor for detecting photons and generating an SIPM analog output signal. A plurality of comparators are provided each having an associated threshold value and being configured to compare the SiPM analog output signal with their associated threshold value and generate a comparison signal. A time to digital converter is configured to receive the comparison signals from the plurality of comparators.

29 Claims, 8 Drawing Sheets

LIDAR READOUT CIRCUIT

FIELD OF THE INVENTION

The invention relates to a LiDAR readout circuit. In particular but not exclusively the present disclosure relates to a LiDAR readout circuit which includes multiple thresholds.

BACKGROUND

A Silicon Photomultiplier (SiPM) is a photon sensitive, high performance, solid-state sensor. It is formed of a summed array of closely-packed Single Photon Avalanche Photodiode (SPAD) sensors with integrated quench resistors, resulting in a compact sensor that has high gain ($\sim 1 \times 10^6$), high detection efficiency (>50%) and fast timing (sub-ns rise times) all achieved at a bias voltage of ~30V.

Traditionally LiDAR with analogue SiPMs is performed by discriminating the output of the SiPM against a fixed threshold corresponding to N-photons, where N is typical set to 1 to allow single-photon detection. However, in high light conditions, many close-in-time photons contribute to the output current/voltage with increments beyond the fixed single-photon threshold. Such contributions are therefore lost by the discriminator liming the number of timestamps of the readout. Increasing the threshold however results in the loss of the information of the single-photon events, which is important for the fast detection high and low light levels There is therefore a need to provide for a LiDAR readout circuit which addresses at least some of the drawbacks of the prior art.

SUMMARY

The present disclosure relates to a LiDAR readout circuit comprising:
  an SiPM sensor for detecting photons and generating an SIPM analog output signal;
  a plurality of comparators each having an associated threshold value and being configured to compare the SiPM analog output signal with their associated threshold value and generate a comparison signal; and
  a time to digital converter configured to receive the comparison signals from the plurality of comparators.

In one aspect, an amplifier is provided for amplifying the SiPM analog output signal in advance of the SiPM analog signal being received by the comparators.

In a further aspect, an output of the amplifier is operably coupled to each of the comparators.

In another aspect, a voltage divider is configured for setting the respective threshold values of the comparators.

In an exemplary aspect, the voltage divider is operably coupled between two reference nodes.

In one aspect, one of the reference nodes is operably coupled to a voltage reference. Advantageously, the other one of the reference nodes is ground.

In a further aspect, a plurality of resistors are operably coupled between the two reference nodes.

In another aspect, the voltage divider sets a corresponding voltage threshold level for each comparator.

In an exemplary aspect, the voltage threshold level for each comparator is different.

In one another aspect, the voltage threshold level of two of more of the comparators is different. Advantageously, the threshold values of the respective comparators increments sequentially from a low threshold value to a high threshold value.

In another aspect, the threshold value for each comparator is determined based on the ambient light level.

In one aspect, a threshold determining circuit is provided.

In another aspect, the threshold determining circuit is operable to be selectively activated.

In a further aspect, the threshold determining circuit is selectively connected to the LiDAR readout circuit via a switch.

In one aspect, the threshold determining circuit comprises an analog-to-digital converter.

In a further aspect, the threshold determining circuit comprises a digital-to-analog converter (DAC) operably coupled between the ADC and at least one one of the comparators.

In an exemplary embodiment; the DAC is configured to receive a digital signal representative of a measured noise level output from the SiPM sensor from the ADC.

In another aspect, the DAC is further configured to receive an arbitrary value which together with the digital signal representative of the measured noise level determines the threshold value for at least one of comparators.

In a further aspect, the SiPM sensor is located on a LiDAR device. Advantageously, the LiDAR device further comprises a laser source.

In one aspect, the laser source is configured to emit laser pulses.

In another aspect, the LiDAR device further comprises optics.

In one aspect, the SiPM sensor is a single-photon sensor.

In a further aspect, the SiPM sensor is formed of a summed array of Single Photon Avalanche Photodiode (SPAD) sensors.

In another aspect, the laser source is an eye-safe laser source.

In one aspect, the SiPM sensor comprises a matrix of micro-cells.

In another aspect, a digital-to-analog converter is configured for setting the respective threshold values of the comparators.

These and other features will be better understood with reference to the followings Figures which are provided to assist in an understanding of the present teaching.

BRIEF DESCRIPTION OF THE DRAWINGS

The present teaching will now be described with reference to the accompanying drawings in which.

DETAILED DESCRIPTION

Figure 1:
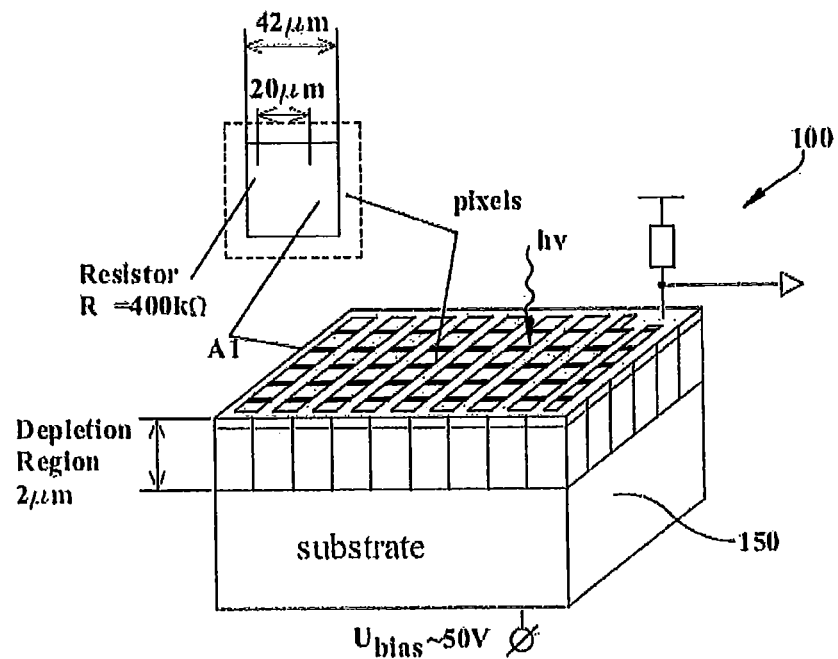
FIG. 1 illustrates an exemplary structure of a silicon photomultiplier.

The present disclosure will now be described with reference to an exemplary LiDAR readout circuit. It will be understood that the exemplary LiDAR readout circuit is provided to assist in an understanding of the teaching and is not to be construed as limiting in any fashion. Furthermore, circuit elements or components that are described with reference to any one Figure may be interchanged with those of other Figures or other equivalent circuit elements without departing from the spirit of the present teaching. It will be appreciated that for simplicity and clarity of illustration, where considered appropriate, reference numerals may be repeated among the figures to indicate corresponding or analogous elements.

Figure 2:
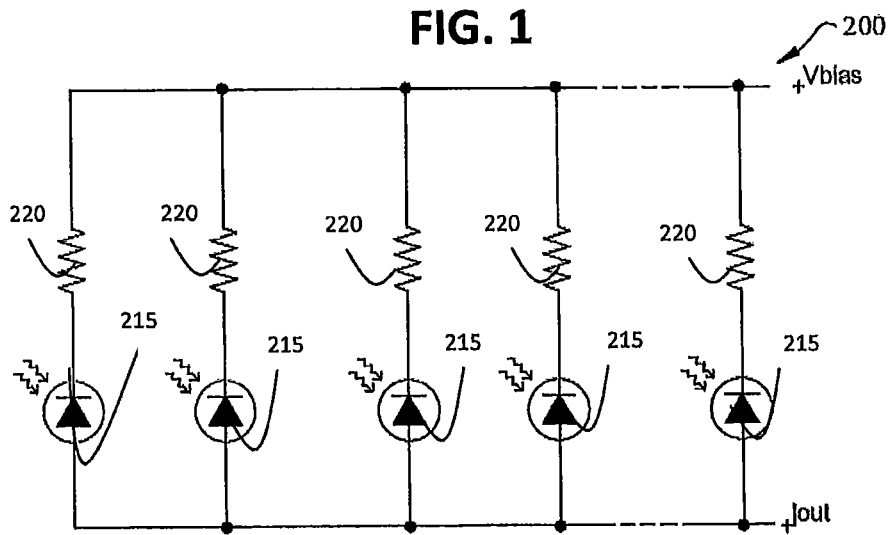
FIG. 2 is a schematic circuit diagram of an exemplary silicon photomultiplier.

Referring initially to FIG. 1, a silicon photomultiplier 100 comprising an array of Geiger mode photodiodes is shown. As illustrated, a quench resistor is provided adjacent to each photodiode which may be used to limit the avalanche current. The photodiodes are electrically connected to common biasing and ground electrodes by aluminum or similar conductive tracking. A schematic circuit is shown in FIG. 2 for a conventional silicon photomultiplier 200 in which the anodes of an array of photodiodes are connected to a common ground electrode and the cathodes of the array are connected via current limiting resistors to a common bias electrode for applying a bias voltage across the diodes.

The silicon photomultiplier 100 integrates a dense array of small, electrically and optically isolated Geigermode photodiodes 215. Each photodiode 215 is coupled in series to a quench resistor 220. Each photodiode 215 is referred to as a microcell. The number of microcells typically number between 100 and 3000 per mm$^2$. The signals of all microcells are then summed to form the output of the SiPM 200. A simplified electrical circuit is provided to illustrate the concept in FIG. 2. Each microcell detects photons identically and independently. The sum of the discharge currents from each of these individual binary detectors combines to form a quasi-analog output, and is thus capable of giving information on the magnitude of an incident photon flux.

Each microcell generates a highly uniform and quantized amount of charge every time the microcell undergoes a Geiger breakdown. The gain of a microcell (and hence the detector) is defined as the ratio of the output charge to the charge on an electron. The output charge can be calculated from the over-voltage and the microcell capacitance.

$$G = \frac{C \cdot \Delta V}{q}$$

Where:
G is the gain of the microcell;
C is the capacitance of the microcell;
$\Delta V$ is the over-voltage; and
q is the charge of an electron.

Figure 3:
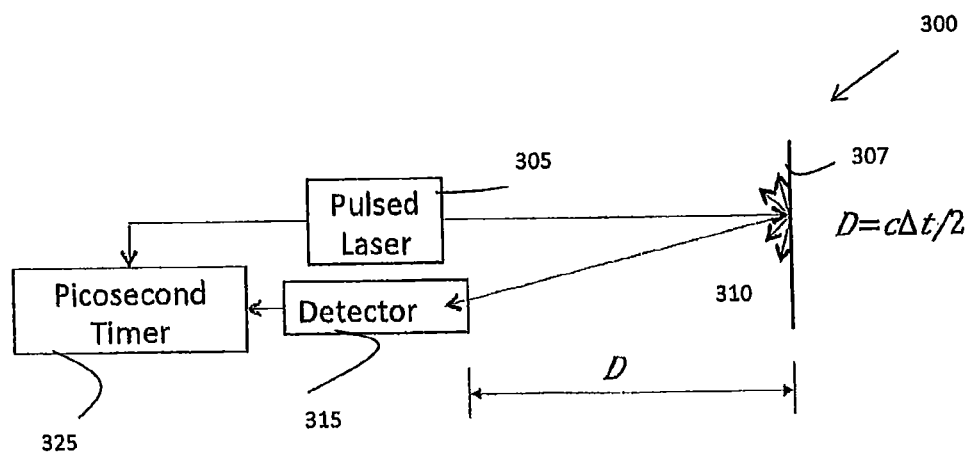
FIG. 3 illustrates an exemplary technique for a direct ToF ranging.

LiDAR is a ranging technique that is increasingly being employed in applications such as mobile range finding, automotive ADAS (Advanced Driver Assistance Systems), gesture recognition and 3D mapping. Employing an SiPM as the photo sensor has a number of advantages over alternative sensor technologies such as avalanche photodiode (APD), PIN diode and photomultiplier tubes (PMT) particularly for mobile and high volume products. The basic components used for a direct ToF ranging system, are illustrated in FIG. 3. In the direct ToF technique, a periodic laser pulse 305 is directed at the target 307. The target 307 diffuses and reflects the laser photons and some of the photons are reflected back towards the detector 315. The detector 315 converts the detected laser photons (and some detected photons due to noise) to electrical signals that are then timestamped by timing electronics 325.

This time of flight, t, may be used to calculate the distance, D, to the target from the equation $$D = c\Delta t/2, \qquad \text{Equation 1}$$

where c=speed of light; and
$\Delta t$=time of flight.

The detector 315 must discriminate returned laser photons from the noise (ambient light). At least one timestamp is captured per laser pulse. This is known as a single-shot measurement. The signal to noise ratio can be dramatically improved when the data from many single shot measurements are combined to produce a ranging measurement from which the timing of the detected laser pulses can be extracted with high precision and accuracy.

Figure 4:
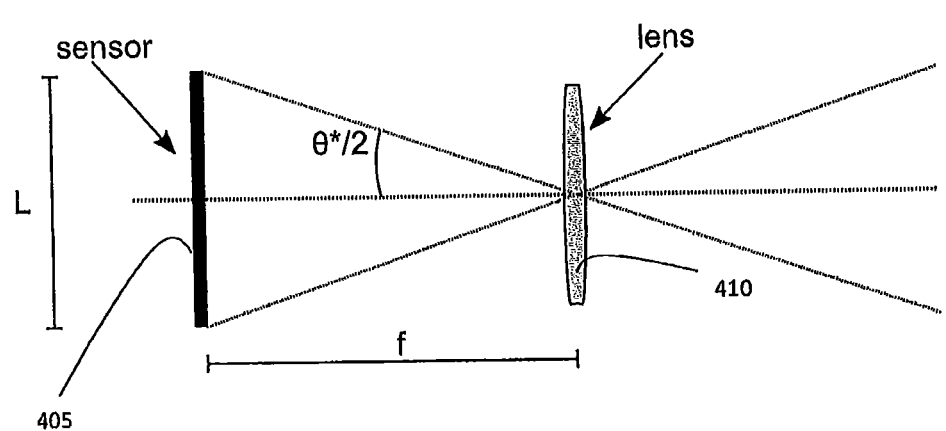
FIG. 4 illustrates an exemplary ToF ranging system.

Referring now to FIG. 4 which shows an exemplary SiPM sensor 400 which comprises an array of Single Photon Avalanche Photodiodes (SPAD) defining a sensing area 405. A lens 410 is provided for providing corrective optics. For a given focal length f of a lens system, the angle of view $\theta_{x,y}$ of a sensor placed on the focal point and with dimensions $L_{x,y}$ is given by:

$$\theta_{x,y} = 2 \times \operatorname{atan}\left(\frac{L_{x,y}/2}{f}\right) \qquad \text{Equation 2}$$

Figure 5:
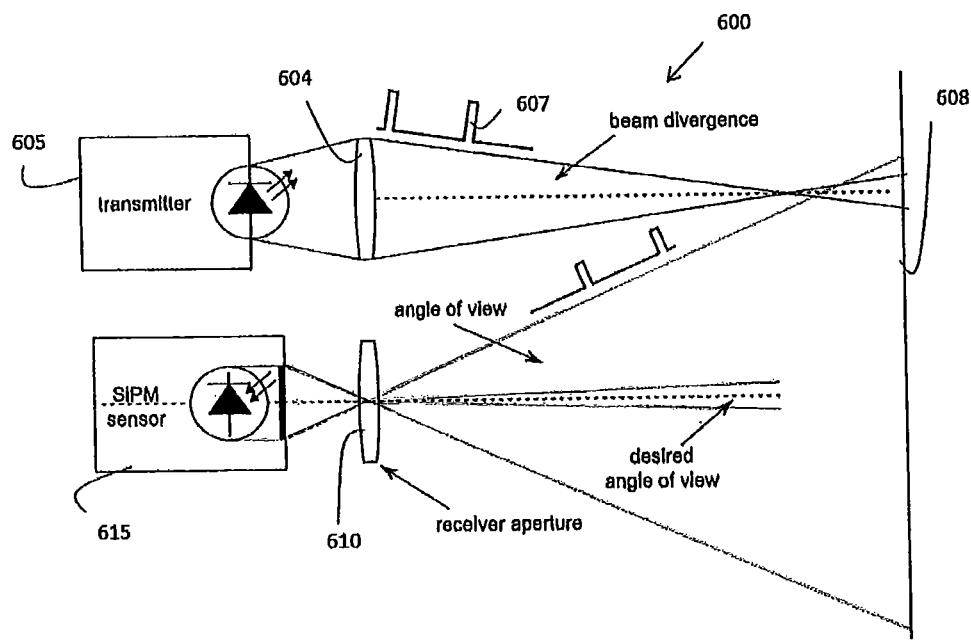
FIG. 5 illustrates an exemplary LiDAR device.

Where:
Focal length of receiver lens: f
Sensor horizontal and vertical length: $L_x$, $L_y$
Sensor angle of view: $\theta_{x,y}$ FIG. 5 illustrates an exemplary LiDAR device 600, which includes a laser source 605 for transmitting a periodic laser pulse 607 through a transmit lens 604. A target 608 diffuses and reflects laser photons 612 through a receive lens 610 and some of the photons are reflected back towards a SiPM sensor 615. The SiPM sensor 615 converts the detected laser photons and some detected photons due to noise to electrical signals that are then timestamped by timing electronics. The average number of detected photons k in a typical output pulse width t is calculated from the incident rate Q and the photon detection efficiency (PDE) as:

$$k = \Phi \times \text{PDE} \times T \qquad \text{Equation 3}$$

Typically, the threshold for the digital readout of an SiPM is set to k to maximize the probability of detecting events. The probability of detecting X photon events when the average number is k is given by:

$$P(X) = e^{-k} \times \frac{k^X}{X!}$$

Figure 6:
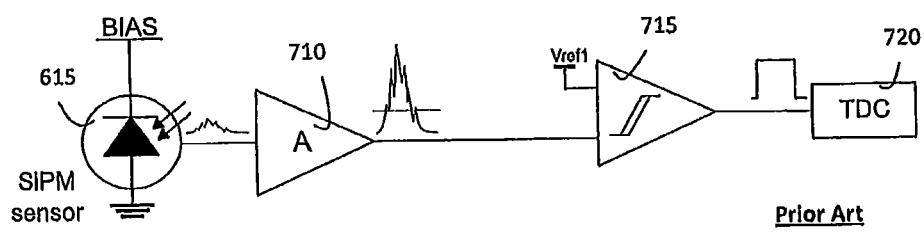
FIG. 6 illustrates a schematic of a prior art LiDAR readout circuit.

When a single threshold, using the comparator readout circuit of FIG. 6, is set to a certain value h, the single event per pulse is registered with a probability given by:

$$P(X \geq h) = 1 - e^{-k} \sum_{i=0}^{\lfloor h \rfloor} \frac{k^i}{i!}$$

All the events occurring with probability P(X≥h') when h'>h will not be distinguished and therefore not counted (or timed) as separate events.

Figure 7:
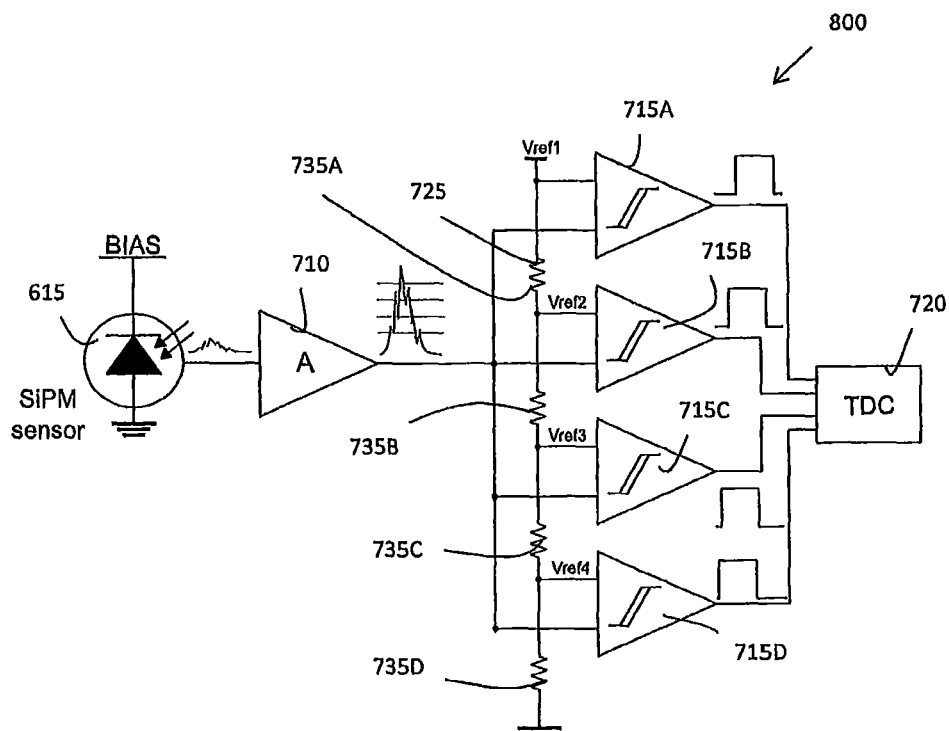
FIG. 7 illustrates a schematic of a LiDAR readout circuit in accordance with the present teaching.

Referring to FIG. 7 which illustrates a LiDAR readout circuit 800 in accordance with the present teaching. In regimes where the photon rate is high, having multiple threshold enables the detection of a larger number of events. The LiDAR readout circuit 800 is configured to provide a multi-threshold system by providing the output of an analog SiPM sensor 615 to a series of discriminators set at different threshold voltages corresponding to single, double, triple photon thresholds, etc. This multi-channel solution enables more events to be successfully detected by the TDC 720 without the need to integrate a readout circuit inside the analog SiPM sensor. Increasing the throughput of the readout circuit 800 allows acquisition times to be significantly reduced which is essential for fast sensors.

The LiDAR readout circuit 800 includes the analog SiPM sensor 615 for detecting photons and generating an analog SIPM output signal. A plurality of comparators 715A-715D are provided and each has an associated threshold value and is configured to compare the analog SiPM output signal with their associated threshold value and generate a comparison signal indicative of the comparison. A time to digital converter (TDC) 720 is configured to receive the comparison signals from the plurality of comparators 715A-715D and time stamp the events. The TDC 720 may be considered as a very high precision counter/timer that can record the time of an event to sub 1 ns resolution. The TDC may be used to measure the time of flight of a photon from a laser pulse to a target 608 and back to the SiPM sensor 615.

An amplifier 710 is provided for amplifying the analog SiPM output signal in advance of the SiPM signal being received by the comparators 715A-715D. The output of the amplifier 710 is operably coupled to each of the comparators 715A-715D. A voltage divider 725 is configured for setting the respective threshold values of the comparators 715-715D. The voltage divider 725 is operably coupled between two reference nodes. One of the reference nodes is operably coupled to a voltage reference source. The other one of the reference nodes is ground or a node having lower voltage level than the other reference node. A plurality of resistors 735A-735D are operably coupled between the two reference nodes. The voltage divider 725 sets a corresponding voltage level for each comparator 715A-715D. The voltage threshold level for each comparator may be different. In an exemplary embodiment, the voltage level of two of more of the comparators 715A-715D is different. The threshold value for each comparator 715A-715D is determined based on the ambient light level. The threshold values of the respective comparators increment sequentially from a low threshold value to a high threshold value. The sequence of threshold values may include a single value, double value, triple value etc. A single value corresponds to a single photon level, while a double value corresponds to twice a single photon level, and a triple value corresponds to three times a single photon level.

The SiPM sensor 615 is located on a LiDAR device 600 which comprises a laser source 605. The laser source 605 is configured to emit laser pulses. Optics in the form of transmit lens 604 and receive lens 610 are also provided on the LiDAR device 600. The SiPM sensor 605 may be a single-photon sensor. Alternatively, the SiPM sensor 615 may be formed of a summed array of Single Photon Avalanche Photodiode (SPAD) sensors. The laser source 605 may be an eye-safe laser source. Laser source eye-safety limitations are detailed in standards set forth by the American National Standards Institute (Ansi) Z136 series or the International standard IEC60825, for example Thus, it is envisaged that the laser source 605 is compatible with the Ansi Z136 or IEC60825 standards. The average power of the laser pulses may be fixed to meet eye-safety standards set as set forth in at least one the AnsiZ136 and IEC60825 standards. It is not intended to limit the present teaching to the exemplary eye safety standards provided which are provided by way of example. The SiPM sensor 615 may comprises a matrix of micro-cells as illustrated in FIG. 1.

Figure 8A:
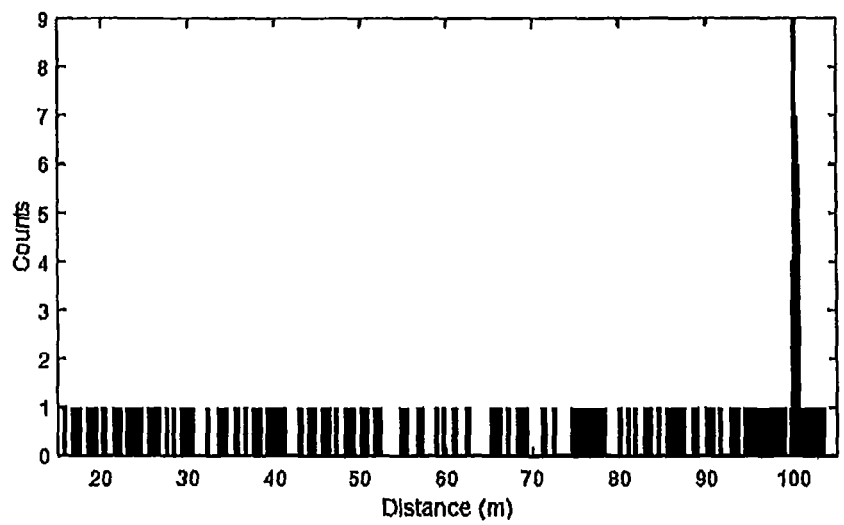
FIG. 8A-8C illustrate LiDAR output histograms.
Figure 8B:
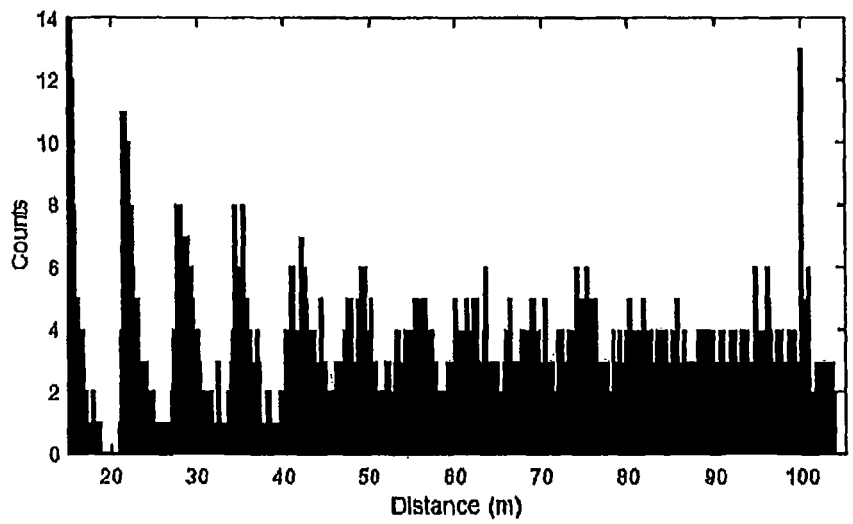
Figure 8C:
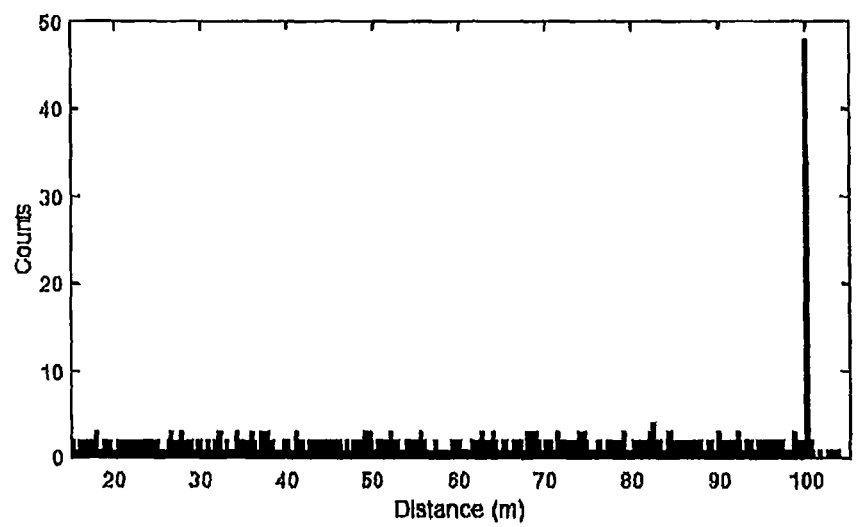

The advantages of the LiDAR readout circuit 800 in accordance with the present teaching are many some of which are detailed as follows. In the scenario of high incident photon rates, having multiple thresholds eliminates the need of dynamically adjusting the threshold to avoid saturation of the readout or to choose the best threshold in terms of signal to noise ratio (SNR), all the thresholds will be processed in parallel therefore building up a high SNR histogram with no need for a feedback loop which ensures faster acquisitions. For low reflective targets, where the low number of detected photons enlarges the acquisition time, a higher throughput allows the acquisition time to be decreased by improving the formation of the histogram. The graph of FIG. 8A is a histogram generated by the prior art LiDAR readout circuit of FIG. 6 which has a single photon threshold comparator output. This LiDAR readout circuit operates satisfactory for low reflective targets since the number of returning photons (from both ambient and laser) is low. The graph of FIG. 8B is also generated using the prior art LiDAR readout circuit of FIG. 6 which uses a single comparator with a single threshold. As illustrated, it does not operate satisfactory for high reflective targets. The number of returning photons is much greater than one potentially saturating the readout chain (shown in the histogram as a regular pattern in misleading local peaks) making the detection of the laser peak difficult. The graph of FIG. 8C is a histogram generated by the LiDAR readout circuit of FIG. 7 in accordance with the present teaching. The histogram in FIG. 8C is generated using a double photon threshold comparator output and operates much better for high reflective targets reducing the input event rate of the readout therefore solving the saturation shown by the 1-photon threshold setting. Accordingly, it will be appreciated by those skilled in the art that by having more than a single threshold setting allows more photons to be efficiently timed and registered with less constrain on the feedback loop typically included in the readout. Ideally, with a sufficient number of thresholds depending on the system properties (angle of view, light conditions etc.), the feedback can be eliminated completely by having all the necessary threshold settings in parallel making the system faster since no feedback is required which is essential for fast LiDAR high frame rate systems. The number of thresholds needed in a system can be calculated from the light conditions (ex. 100 klux for outdoors), maximum reflectivity, optical aperture, angle of view and sensor PDE. From the range of min-max detected photons per pulse, one can specify the number of thresholds.

Figure 9:
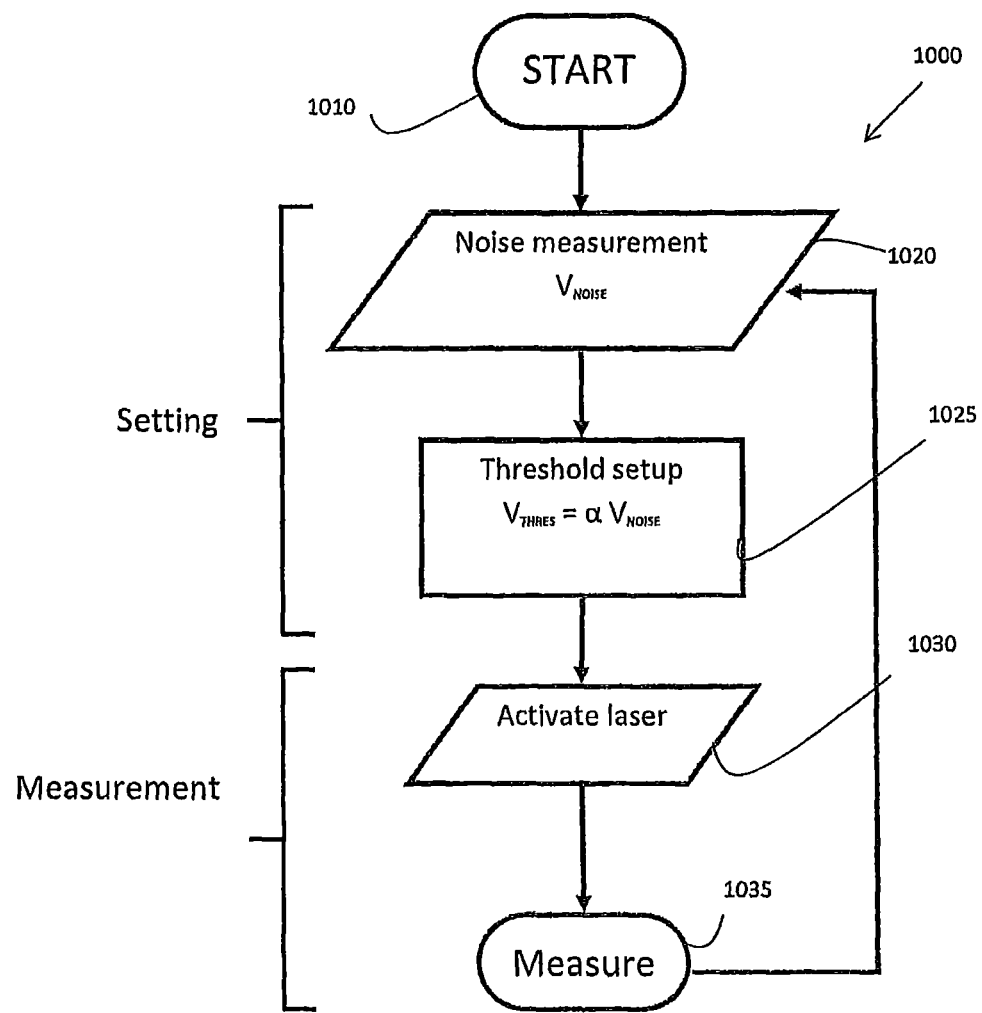
FIG. 9 is a flow chart illustrating exemplary steps for determining a threshold level.

Referring to FIG. 9 which provides a flow chart 1000 illustrating exemplary steps for determining the thresholds for the respective comparators 715A-715D. A noise level measuring process is initiated, step 1010. The noise level is measured with no signal source (laser) activated so that the sensor is only exposed to uncorrelated light. Its response is therefore a superimposition of dark noise and background light noise (ambient light) and its associated shot noise. When amplified, the noise coming from the amplifier is superimposed to the SiPM response. This is the input of the comparator. Therefore, this is the voltage $V_{NOISE}$ that must be measured to set a correct threshold, step 1020. The threshold can be set to $\alpha V_{NOISE}$, where $\alpha$ is an arbitrary value, typically >1, for noise rejection, step 1025. Once the threshold is set, the actual measure can take place and therefore the laser source can be activated, step 1030. The LiDAR system then operates as previously described with reference to FIG. 8, step 1035.

Figure 10:
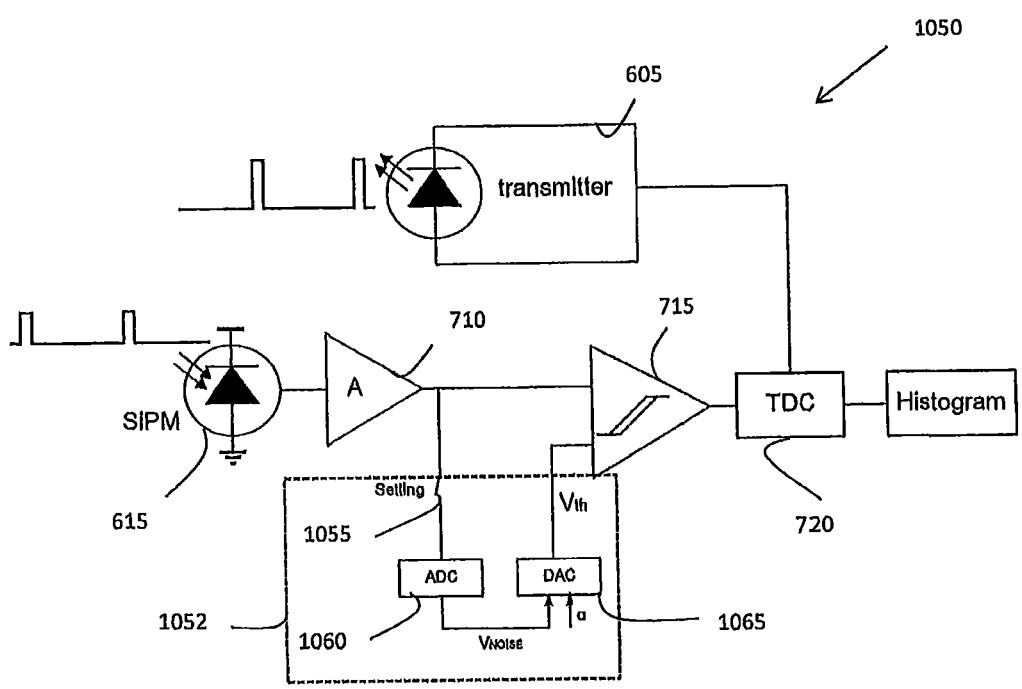
FIG. 10 is another LiDAR readout circuit which includes a threshold determining circuit.

Referring to FIG. 10 which illustrates an exemplary circuit 1050 which may be used to measure the noise level as described with the reference to the flow chart 1000. The components which have been previously described are indicated by similar reference numerals. A threshold determining circuit 1052 is operably coupled between the amplifier 710 and the comparator 715. The threshold determining circuit 1052 comprises a switch 1055, an analog-to-digital converter (ADC) 1060 and a digital-to-analog converter (DAC) 1065 in the exemplary embodiment. During step 1020 when the noise level is being actively determined the switch 1055 is closed such that the ADC 1060 is connected to the output of the amplifier 710. The amplified signal from the SiPM 615 which is representative of the noise level is relayed to the ADC 1060 and a digital value representative of the noise level is output from the ADC 1060 to the DAC 1065 together with the arbitrary value $\alpha$. Both are stored until the next threshold analysis is needed. While the noise level is being measured the laser source 605 is not activated. In step 1035 the switch 1055 is opened thereby disconnecting the ADC 1060. The laser source 605 is activated and the amplified signal from the amplifier 710 is relayed to the comparator 715 which is set with the threshold level as previously determined. When the LiDAR system 1050 scans another point/target, a new threshold level is calculated by repeating step 1020.

In regimes where the photon rate is high, having multiple threshold enables the detection of a larger number of events. The LiDAR readout circuit 800 is configured to provide a multi-threshold system by providing the output of an analog SiPM sensor 615 to a series of discriminators set at different threshold voltages corresponding to single, double, triple photon thresholds, etc. This multi-channel solution enables more events to be successfully detected by the TDC 720 without the need to integrate a readout circuit inside the analog SiPM sensor. Increasing the throughput of the readout circuit 800 allows acquisition times to be significantly reduced which is essential for fast sensors.

The LiDAR readout circuit 800 includes the analog SiPM sensor 615 for detecting photons and generating an analog SIPM output signal. A plurality of comparators 715A-715B are provided and each has an associated threshold value and is configured to compare the analog SiPM output signal with their associated threshold value and generate a comparison signal indicative of the comparison. A time to digital converter (TDC) 720 is configured to receive the comparison signals from the plurality of comparators 715A-715D. The TDC 720 may be considered as a very high precision counter/timer that can record the time of an event to sub 1 ns resolution. The TDC may be used to measure the time of flight of a photon from a laser pulse to a target 608 and back to the SiPM sensor 615.

This process may be repeated each time the noise coming from the environment changes. For example, in a LiDAR system, when the sensor is pointing at different targets, their different reflectivity determines different noise levels which must be correctly measured. It will be appreciated by those skilled in the art that the proposed multi-threshold LiDAR system eliminates the need of the single threshold setting by the availability of a defined number of pre-set thresholds values. The number of thresholds, and therefore comparators, is defined in the design process considering the range of incoming light levels which can be calculated from the optical setting of the LiDAR system (angle of view and aperture), and the min-max background light levels, according to its application.

Figure 11:
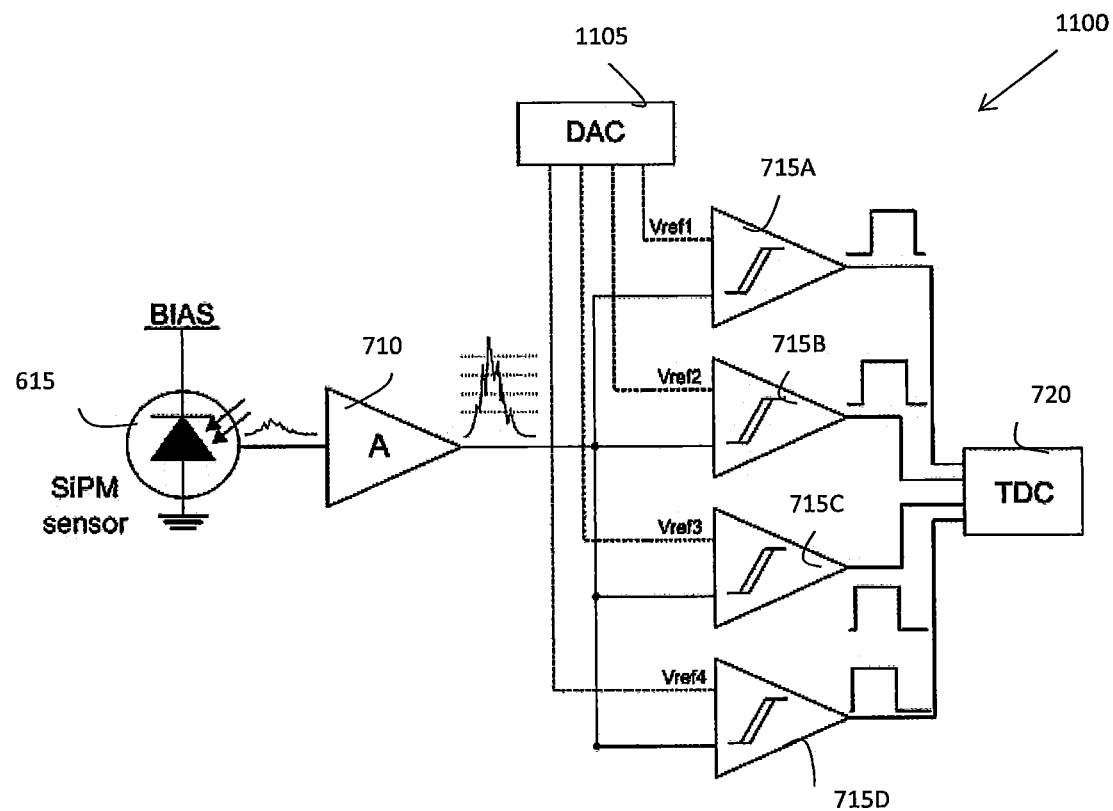
FIG. 11 illustrates a schematic of another LiDAR readout circuit which is in accordance with the present teaching.

Referring to FIG. 11 which illustrates another LiDAR readout circuit 1100 which is also in accordance with the present teaching. The LiDAR readout circuit 1100 is substantially similar to LiDAR readout circuit 800 and like components are indicated by similar reference numerals. The main difference between the readout circuits is that the threshold values in the LiDAR readout circuit 1100 are set using a Digital-to-Analog converter (DAC) 1105 instead of using a voltage divide. Otherwise the operation of the LiDAR readout circuit 1100 is substantially similar to that of LiDAR readout circuit 800.

It will be appreciated by the person of skill in the art that various modifications may be made to the above described embodiments without departing from the scope of the present invention. In this way it will be understood that the teaching is to be limited only insofar as is deemed necessary in the light of the appended claims. The term semiconductor photomultiplier is intended to cover any solid state photomultiplier device such as Silicon Photomultiplier [SiPM], MicroPixel Photon Counters [MPPC], MicroPixel Avalanche Photodiodes [MAPD] but not limited to.

Similarly the words comprises/comprising when used in the specification are used to specify the presence of stated features, integers, steps or components but do not preclude the presence or addition of one or more additional features, integers, steps, components or groups thereof.

What is claimed is:

1. A LiDAR readout circuit comprising:
    an SiPM sensor for detecting photons and generating an SiPM analog output signal;
    a plurality of comparators each having an associated threshold value and being configured to compare the SiPM analog output signal with their associated threshold value and generate a comparison signal, wherein the associated threshold values of the plurality of comparators are different;
    a time to digital converter configured to receive the comparison signals from the plurality of comparators; and
    a threshold determining circuit coupled to the output of the SiPM sensor and to the input of each of the plurality of comparators, wherein:
    the LiDAR readout circuit causes the threshold determining circuit to perform a noise measurement when a laser source is not activated to determine the associated threshold value of each of the plurality of comparators; and
    the LiDAR readout circuit subsequently activates the laser source and performs a measurement using the associated threshold value of each of the plurality of comparators.

2. The LiDAR readout circuit as claimed in claim 1, further comprising an amplifier for amplifying the SiPM analog output signal in advance of the SiPM analog output signal being received by the comparators.

3. The LiDAR readout circuit as claimed in claim 2, wherein an output of the amplifier is operably coupled to each of the comparators.

4. The LiDAR readout circuit as claimed in claim 1, further comprising a voltage divider configured for setting the associated threshold values of the comparators.

5. The LiDAR readout circuit as claimed in claim 4, wherein the voltage divider is operably coupled between two reference nodes.

6. The LiDAR readout circuit as claimed in claim 5, wherein one of the reference nodes is operably coupled to a voltage reference.

7. The LiDAR readout circuit as claimed in claim 6, wherein the other one of the reference nodes is ground.

8. The LiDAR readout circuit as claimed in claim 5, wherein a plurality of resistors are operably coupled between the two reference nodes.

9. The LiDAR readout circuit as claimed in claim 4, wherein the voltage divider sets a corresponding voltage level threshold for each comparator.

10. The LiDAR readout circuit as claimed in claim 9, wherein corresponding voltage level thresholds for each comparator are different.

11. The LiDAR readout circuit as claimed in claim 9, wherein corresponding voltage level thresholds of two of more of the plurality of comparators are different.

12. The LiDAR readout circuit as claimed in claim 1, wherein the associated threshold values of the respective comparators increment sequentially from a low threshold value to a high threshold value.

13. The LiDAR readout circuit as claimed in claim 1, wherein the associated threshold value for each comparator is determined based on the ambient light level.

14. The LiDAR readout circuit as claimed in claim 1, further comprising a threshold determining circuit.

15. The LiDAR readout circuit as claimed in claim 14, wherein the threshold determining circuit is operable to be selectively activated.

16. A LiDAR readout circuit as claimed in claim 1, wherein the SiPM sensor is located on a LiDAR device.

17. A LiDAR readout circuit as claimed in claim 16, wherein the LiDAR device further comprises a laser source.

18. A LiDAR readout circuit as claimed in claim 17, wherein the laser source is configured to emit laser pulses.

19. A LiDAR readout circuit as claimed in claim 16, wherein the LiDAR device further comprises optics.

20. A LiDAR readout circuit as claimed in claim 1, wherein the SiPM sensor is a single-photon sensor.

21. A LiDAR readout circuit as claimed in claim 1, wherein the SiPM sensor is formed of a summed array of Single Photon Avalanche Photodiode (SPAD) sensors.

22. The LiDAR readout circuit as claimed in claim 17, whererin the laser source is an eye-safe laser source.

23. The LiDAR readout circuit as claimed in claim 1, wherein the SiPM sensor comprises a matrix of micro-cells.

24. The LiDAR readout circuit as claimed in claim 1, wherein further comprising a digital-to-analog converter configured for setting the associated threshold values of the comparators.

25. A LiDAR readout circuit comprising:
an SiPM sensor for detecting photons and generating an SiPM analog output signal;
a plurality of comparators each having an associated threshold value and being configured to compare the SiPM analog output signal with their associated threshold value and generate a comparison signal, wherein the associated threshold values of the plurality of comparators are different;
a time to digital converter configured to receive the comparison signals from the plurality of comparators; and
a threshold determining circuit, wherein the threshold determining circuit is selectively connected to the LiDAR readout circuit via a switch.

26. The LiDAR readout circuit as claimed in claim 25, wherein the threshold determining circuit comprises an ADC (analog-to-digital converter).

27. The LiDAR readout circuit as claimed in claim 26, wherein the threshold determining circuit comprises a digital-to-analog converter (DAC) operably coupled between the ADC and at least one of the comparators.

28. The LiDAR readout circuit as claimed in claim 27, wherein the DAC is configured to receive a digital signal representative of a measured noise level output from the SiPM sensor from the ADC.

29. This LiDAR readout circuit as claimed in claim 28, wherein the DAC is further configured to receive an arbituary value which together with the digital signal representative of the measured noise level determines the associated threshold value for at least one of the comparators.

* * * * *